United States Patent [19]
Hollander et al.

[11] Patent Number: 5,997,355
[45] Date of Patent: Dec. 7, 1999

[54] ANTENNA-EFFECT SUPPRESSOR DEVICE

[75] Inventors: Milton Bernard Hollander; William Earl McKinley, both of Stamford; Russell Stewart, Fairfield, all of Conn.

[73] Assignee: Omega Engineering, Inc., Stamford, Conn.

[21] Appl. No.: 09/039,496

[22] Filed: Mar. 16, 1998

Related U.S. Application Data

[62] Division of application No. 08/605,607, Feb. 22, 1996, abandoned.

[51] Int. Cl.⁶ .................................................... H01R 33/00
[52] U.S. Cl. ............................................. 439/620; 439/696
[58] Field of Search ................................ 439/695, 696, 439/620, 651

[56] References Cited

U.S. PATENT DOCUMENTS

| | | | |
|---|---|---|---|
| 2,436,586 | 2/1948 | Mangold | 439/696 |
| 2,850,712 | 9/1958 | Franklin | 439/696 |
| 3,020,518 | 2/1962 | Camping et al. | 439/696 |
| 3,855,569 | 12/1974 | Tymkewicz | 439/695 |
| 4,194,805 | 3/1980 | Ayer et al. | 439/696 |
| 5,551,893 | 9/1996 | Johnson | 439/620 |
| 5,586,902 | 12/1996 | Hopf et al. | 439/685 |

OTHER PUBLICATIONS

Research Disclosure, Sep. 1990, No. 317 Kenneth Mason Publications Ltd, England.

*Primary Examiner*—Paula Bradley
*Assistant Examiner*—Tho D. Ta
*Attorney, Agent, or Firm*—William A. Drucker

[57] ABSTRACT

An electrical connector device is described and illustrated which includes a ferrite element and an integral conductor lead. The ferrite element and connector are preassembled to a thermocouple by a pair of dissimilar metal elongated wire leads. The connector, which includes the ferrite element, is attached to the leads at the end of the leads remote from the thermocouple. The leads pass through the connector housing in which the ferrite element is embedded and through the ferrite element.

13 Claims, 10 Drawing Sheets

ANTENNA-EFFECT SUPPRESSOR DEVICE

RELATED CASE

This application is a division of application Ser. No. 08/605,607 filed Feb. 22, 1996 and now abandoned.

BACKGROUND OF THE INVENTION

This invention relates generally to electrical devices such as multi-part plug and socket assemblies, switches, feed through, test leads, signal wires, and relays, and more specifically relates to electrical devices that incorporate an antenna-effect inhibiting feature to protect the signals carried by the device from electromagnetic interference.

The invention related further to protecting electrical circuits from receiving electromagnetic interference which might be induced in conductors leading to the electrical circuit. More specifically the invention relates to electrical connectors which provide for suppression of electromagnetic interference by means which form part of the connector itself or as an accessory thereto.

It is known that electrical signals carried by connectors, or adjacent apparatus, may be subject to electromagnetic interference as the result of induced signals picked up from the radiation of adjacent electrical equipment, such interference results from leads acting as an antenna that senses stray electromagnetic radiation; accordingly, the sensing of stray signals in this manner is known as the "Antenna-effect". Various efforts have been made to avoid or suppress the result of the antenna-effect, but such efforts have been found to be inconvenient and/or expensive to implement, or both.

For example, it has been found in the past that antenna-effect stray signals can be avoided by encapsulating leads in sheaths of magnetic-shielding sheet material, or by determining the strength of nearby stray signal fields and then moving all such nearby sources to a physical distance from the leads that has been calculated to prevent the possibility of undesired signals being picked up by electromagnetic induction. It can be seen, readily, that such preventive methods and techniques are indeed costly and inconvenient. Other attempts to reduce or avoid antenna-effect stray signals have involved the use of ferrite cores. However, until now such uses have required additional circuit elements, such as insertion of a jumper cable, having a permanently included ferrite core, in series with the main conductors in the circuit; or, awkwardly and inconveniently surrounding one or more of the circuit conductors with separately applied ferrite cores.

It is established practice, in industries that make use of thermocouple sensors, to couple the sensor into a related electrical circuit by means of an electrical connector. When for example thermocouples are connected to instruments such as panel meters, controllers and transmitters, the input signal from the sensor or transducer usually travels substantial distances along fine gauge electrically conductive wire leads. The length and nature of such leads and the environment in which they must function often create conditions that favour occurrence of the antenna-effect. In many cases, the leads or signal wires from a sensor or thermocouple are first attached, for convenience, to an electrical connector, for coupling to an instrument or the like. As soon as the conductors of the connector are electrically coupled to the circuit, a potential antenna is created. Of particular importance are thermocouple connectors which are particularly susceptible to the antenna-effect because of the long lead conductive path of the conductors themselves and the high input impedance of the instrumentation.

This invention applies to the fields of use wherein there is necessity for including an electrical device in a low level signal circuit, e.g. a thermocouple sensor, and provides, a new apparatus for eliminating undesired electromagnetically-induced stray signals.

Accordingly, it is an object of this invention to provide means associated with an electrical device that is capable of removing stray signals that may be induced in the leads of the device.

It is another object of this invention to provide an apparatus for eliminating the effects of undesired stray signals in circuits, that is uncomplicated in design, and that is simple and relatively inexpensive to produce.

It is still another object of this invention to provide means associated with an electrical device for eliminating the effects of undesired stray signals in its circuits, that is easily adaptable to single-wire or multi-wire connections.

Another and further object of this invention is to provide means associated with an electrical device for eliminating the effects of undesired stray signals in its circuits, that can be manufactured easily in various configurations to accommodate differing circuit requirements.

And yet another and further object of this invention is to provide means associated with an electrical device for elimination of the effects of undesired stray signals in its circuits in which operative elements of the device may be configured to facilitate insertion and removal of wire conductors.

Other objects are to provide:

(A) In an electrical device e.g. a plug and socket, a switch or a relay, which includes two contact members with respective surfaces, for bringing into contact to establish an electrical connection, antenna-effect inhibiting means disposed adjacent to the connection surface of at least one said contact member.

(B) An electrical device wherein said antenna-effect inhibiting means is a ferrite element, as defined herein.

(C) An electrical device wherein said at least one contact member is one part of a multi-part plug and socket connector.

(D) An electrical device wherein said antenna-effect inhibiting means is incorporated with said device.

(E) An electrical device wherein said antenna-effect inhibiting means is a module separably incorporated with said device, or attachable thereon.

(F) An electrical device wherein said antenna-effect inhibiting means surrounds said connection surface, and particularly may be a multi-part element assemblable about said connection surface.

(G) An electrical device wherein said antenna-effect inhibiting means is incorporated in said one contact member, or forms a housing for said at least one contact member.

In another form the electrical device includes two or more discrete contact members with respective surfaces for bringing into contact to establish an electrical connection, and has respective antenna-effect inhibiting means disposed adjacent to the respective connection surface of each said contact member.

A feature of this invention is the provision for association with an electrical device of a signal inhibiting ferrite element that surrounds a wire lead intended for connection in a circuit, so as to prevent the propagation of stray signals through the device to undesired parts of the circuit.

The term "ferrite", as commonly understood in the electronics field, denotes a particular material having one or more oxides of iron in particulate form in a carrier such as a plastics material. This usage of the term "ferrite" is to be distinguished from the usual dictionary definition which is a generic name for a number of oxides of iron. In this specification, the term "ferrite" is to be understood as including within its scope any suitable material having an absorption and/or shielding effect as concerns electromagnetic waves which may be emitted at or adjacent to a zone of completion of an electrical circuit. Known ferrite elements consist of ferrite material sintered into a convenient shape. Other known "ferrite" materials for the suppression of electromagnetic interference are nickel-zinc compositions and manganese-zinc materials, of different compositions to permit selection of an optimum type for a given application; pressed parts, components, and powders are known.

It has been found that ferrite elements, when properly included in an electrical circuit, act as an electromagnetic "sponge" to absorb the unwanted electromagnetic wave energy and to reduce or eliminate the antenna-effect of the conductors with which the ferrite elements are associated.

These and other and further objects, features and advantages of this invention will be made apparent to those having skill in this art, by the following specification considered with reference to the accompanying drawings, in which:

DETAILED DESCRIPTION OF THE INVENTION

Figure 1:
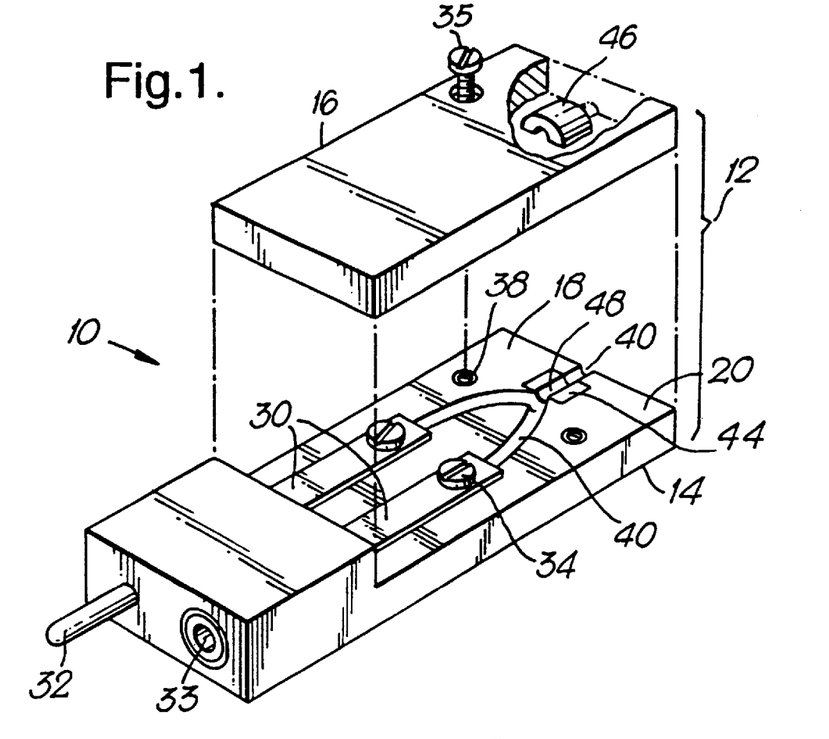
FIG. 1 is a partially cut-away pictorial representation of one embodiment of an electrical device module and ferrite element in accordance with this invention.

Referring now more specifically to the drawings, FIG. 1 may be seen to illustrate a device including a ferrite element in accordance with this invention in which the connector device 10 comprises a housing 12 of insulating material having a first separable housing portion 14 and a second separable housing portion 16 that are configured to engage each other about a common separation plane 18 that extends in substantially parallel, co-planar relationship with a contact-element supporting face 20 on first housing portion 14. A pair of contact elements 30 are mounted on the housing, although it is considered obvious that just one or substantially more than two contact elements may be mounted to the housing if desired. Similarly, although the contact elements 30 shown in FIG. 1 are of the type commonly identified as male contact elements, it is considered obvious that other types of contact elements, such as the female contacts shown and described elsewhere in this specification, may be used in lieu of the male contacts, without departing from the spirit and scope of this invention. In FIG. 1, one of contact elements 30 includes near one end a male end portion 32, and the other contact element includes near a corresponding end, a female contact receptacle portion 33. Both the male and female contact portions 32 and 33 are adapted to electrically and mechanically engage a mating external conductor (not shown) in any obvious and well-known manner; in this case, it is apparent that the mating external conductors would be a mating female contact element for male contact portion 32 and a male contact element for female contact portion 33. External conductors having these conventional shapes, will electrically and mechanically engage male contact portion 32 and female contact portion 33 in a manner well known to those having skill in the electrical connector art.

Each electrical contact element 30 further includes, at the opposite end remote from the male and female contact portions shown, a screw terminal 34 for electrically coupling the contact 30 to a second external conductor (not shown). For this purpose, the second external conductor may have any suitable form, such as standard type of flexible insulated electrical wire, that is suitable for coupling to, i.e. electrically and mechanically engaging, screw terminal 34, so as to establish an electrical path extending through and away from connector 10, via contact 30 and the external conductor. Contact 30, and any external conductors to which it is coupled, together form an electrical path extending through and away from the housing 12.

The two separable portions 14 and 16 of housing 12 are secured together by any convenient fastening means, such as one or more fastening screws 35 and mating threaded bores 38. Portions 14 and 16 preferably are secured together after screw terminals 34 have engaged one or more external conductors to contact element or elements 30, so as to provide a cover for each screw terminal connection and to form a unified connector housing 12.

Housing portion 14 includes a conductor guide groove 40 that serves to constrain and to guide an external conductor from screw terminal 34, out of and away from housing 12. Along the portion of the path represented by the groove 40, a first part 44 of a toroidal ferrite core element 42 (shown in FIG. 2) is secured to holding portion 14, as by gluing, force-fitting, moulding or any other suitable means, into the electrically insulating material of the housing. The second part 46 of ferrite core element 42 is secured to housing portion 16 in any similarly convenient manner, in position to mate with first part 44 so as to form a complete toroidal structure, having a conductor passage 48 extending there through, as shown in FIG. 2, when housing portions 14 and 16 are fastened together as by fastening screws 35.

Figure 2:
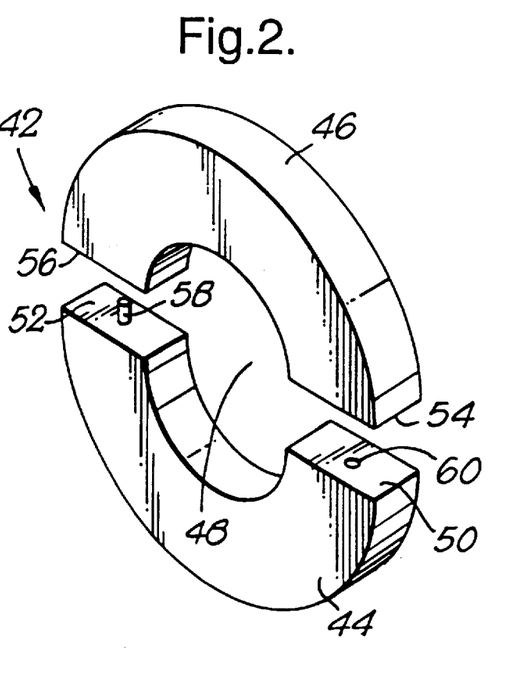
FIG. 2 is a pictorial representation of a modified form of the ferrite element used in the device of FIG. 1.
Figure 3:
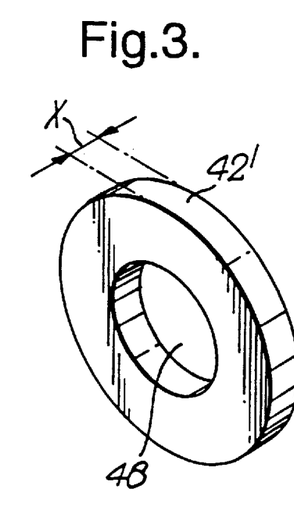
FIG. 3 is a pictorial representation of another form of ferrite element that can be used in this invention.

The ferrite core member 42 illustrated in FIG. 2 is intended to illustrate the characteristic toroidal shape of such cores. In this particular embodiment, the core 42 is divided into two halves, 44, 46 which together form a complete toroidal shape. The end faces 50, 52 and 54, 56 of the core halves 44, 46 may be provided, as shown in FIG. 2, with mating projections 58, and receptacles 60, to help align and maintain the relative positions of the two halves when they are brought together in mating relationship. The division of core 42 into two halves 44, 46 accommodates the particular design and uses of the connector illustrated in FIG. 1, but it should be understood that other ferrite element configurations can be used in connectors constructed in accordance with this invention, including a unitary one-piece element as illustrated in FIG. 3. The principal requirement of any element used with this invention is that it must include a conductor passage here shown as passage 48, to accommodate a portion of the axial length of a conductive path along which electrical signals will be transmitted.

In the connector device embodiment illustrated in FIG. 3, the axial length dimension X, of the ferrite element 42', is shown to be comparatively short relative to the diameter of the centrol conductor passage 48. It should be recognised, however that dimension X may be increased by any desired amount, so that the shape of element 42 or 42' may eventually more nearly represent a tube rather than a doughnut-shaped torus. For the purpose and uses of this Invention, both tubular and toroidal shapes may be used, and either shape may be either unitary as shown in FIG. 3, or divided into separable sections as suggested in FIG. 2.

Figures 4, 5:
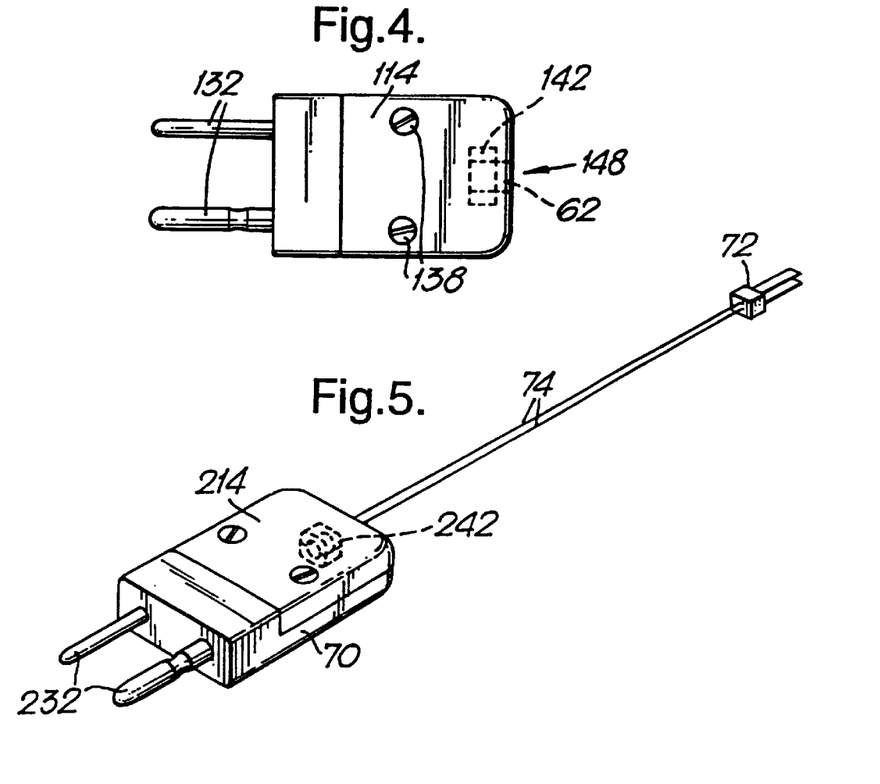
FIG. 4 is a plan view of a different form of device including a ferrite element in accordance with this invention.
FIG. 5 is a pictorial representation of an embodiment of an electrical device including a ferrite element in accordance with this invention, having an integral wire conductor lead.

FIG. 4 illustrates, for purpose of completeness, an electrical connector device assembly having a pair of male contact members 132 extending from a two piece housing 114 in which a unitary ferrite element 142, of the type illustrated in FIG. 3, is enclosed when the two parts of the housing are brought together and secured by one or more fasteners such as screw 138, in the manner described above with reference to the connector if FIG. 1. In this connector, one or more external conductors such as wire leads may be separably fastened to the ends of contact members 132 within the housing in the same or any similar manner described with reference to the connector in FIG. 1, so that such external conductors may be passed through the central conductor passage 148 of element 142 and extended outwardly from housing 114 via an exit passage 62 corresponding generally to exit passage 40 of FIG. 1.

FIG. 5 illustrates an electrical connector device 70 including a ferrite element in accordance with this invention preassembled to a thermocouple 72 by means of a pair of elongated wire leads 74 that may be made, typically, from dissimilar metal. It is known that dissimilar conductive leads in this configuration will heighten the antenna-effect pickup of stray electromagnetic signals. A connector permanently attached to the ends of such leads remote from the thermocouple device, accordingly will be found to be especially effective in eliminating the effects caused by such stray signals.

In this embodiment of the invention, the housing 214 supports a pair of electrical contact members having male contact portions 232 extending from the housing. Wire leads 74 are coupled to the electrical contacts of male portions 232 within the housing 214, and they extend outwardly from the housing after passing through an embedded ferrite element 242 within the housing. As explained previously in connection with the embodiment of the invention illustrated in FIG. 1, any number of associated conductors such as wires leads may by made to pass outwardly away from the housing through an appropriately-sized internally-positioned element 242.

Figure 6:
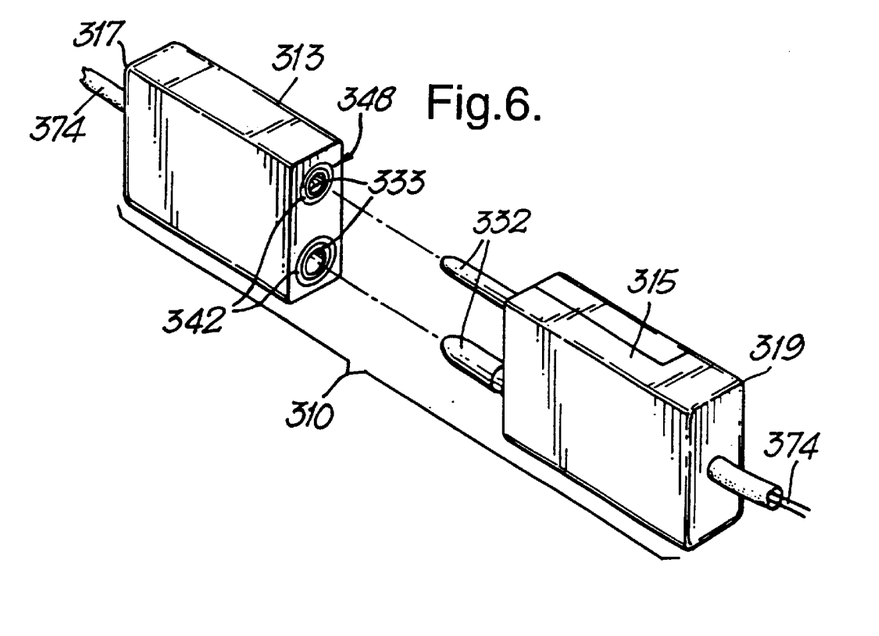
FIG. 6 is a pictorial representation of an embodiment of this invention including a separable, two-piece electrical device.

FIG. 6 illustrates a two-part mating electrical connector device assembly 310 having a female half 313 and a male half 315, each having one or more wire leads 374 extending outwardly and away from their respective housing members 317 and 319. Female connector portion 313 includes a pair of electrical contacts having female receptacle portions 333 mounted to the housing and male connector portions 315 includes a pair of electrical contacts having male contact portions 332. The contacts may be mounted to the housing in any known manner as previously described, and wire leads or other suitable forms of external conductors may be electrically coupled to the electrical contacts within the housing, also in any known manner. In connector housing half 313 the tubular-shaped female receptacle portions 333 are each surrounded by ferrite elements 342 which may be either toroidal or tubular in shape. The elements 342 are made to surround the female portions 33 by extending their tubular bodies through a control conductor passage 348 in each element 342. It can be seen readily that this structure affords the advantage of immediately and effectively surrounding an axial portion of the length of the continuous electrical flow path that is formed when the male contact portions 332 are mated with the female contacts 333 in accordance with customary electrical connector usage.

Figure 7:
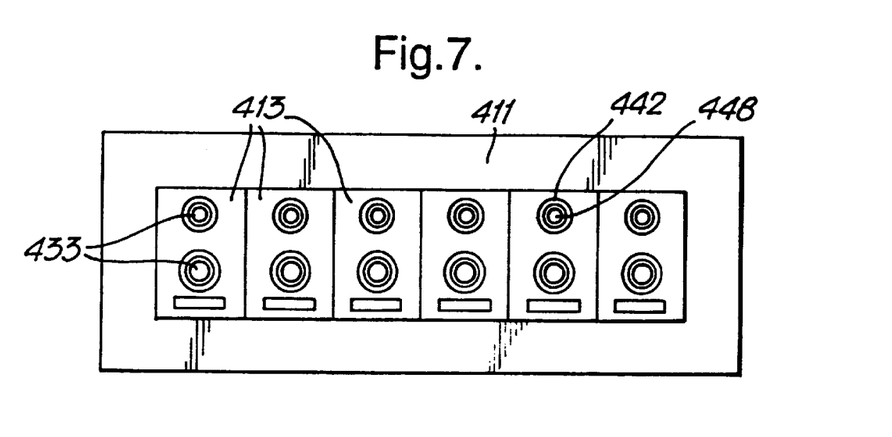
FIG. 7 is a front elevation view of female portions of a two-piece device such as is shown in FIG. 6, shown mounted in a multiple array in a panel.

In FIG. 7. a plurality of female connector devices 413 which may be similar or identical to connector halves 313 shown in FIG. 6, are mounted in substantially parallel, side-by-side array in a panel member 411. In the manner of the connector halves 313 shown in FIG. 6, each unit 413 includes a pair (or any desired number) of female contact portions 433, each surrounded by a ferrite element 442 having a central passage 448. This figure is intended to illustrate how a connector in accordance with this invention nay be mounted for convenient use in multiple array. Suitable conductive leads may be internally connected to contact portions 433 and allowed to extend outwardly away from connectors 313 in a rearward direction. For the purpose of clarity it is noted that the rearward direction extends beneath the plane of this drawing and the wire conductors, therefore, are not shown. When the connectors 413 are mounted in this manner in a supporting panel 411, they may be used readily and conveniently to couple with any suitable form of external conductor that can be inserted and/or withdrawn from the axial central openings XX within female contact portions 433.

Figure 8:
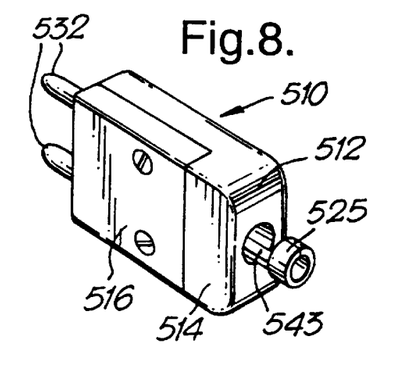
FIG. 8 is a pictorial representation of another embodiment of an electrical device including a ferrite element in accordance with this invention, illustrating the signal-inhibiting element mounted to a connector housing in external configuration.

In the embodiment of this invention illustrated in FIG. 8, a connector device 510 having a housing 512, with first and second separable portions 514 and 516, and a pair of male contact members 532 mounted thereto, further includes an externally mounted ferrite element 525 supported on the exterior of housing 512 by means of a support bracket 543 coupled to housing portion 514. It will be understood, however, that bracket 543 can be mounted readily to either housing half 514 of 516, within the scope of the invention. The bracket 543 may be made of metal or plastic, although plastic is preferable to preserve the conductive symmetry of the element so as to optimise the capture of stray electromagnetic signals.

Figure 9:
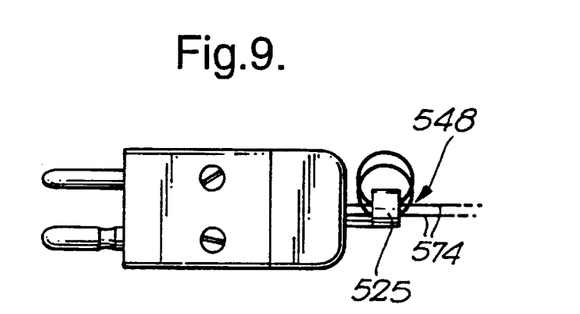
FIG. 9 is a plan view of the electrical connector of FIG. 7, showing an alternate arrangement for extending a wire lead from the device.

FIG. 9 illustrates the connector of FIG. 8 in which external conductors 574 in the form of lead wires extending away from the connector housing 514 have been looped through the externally mounted element 525 so that they pass through the conductor passage 548 in the element twice instead of merely once. It has been determined that this looped configuration can provide enhanced antenna-effect signal absorption when desired.

Figure 10:
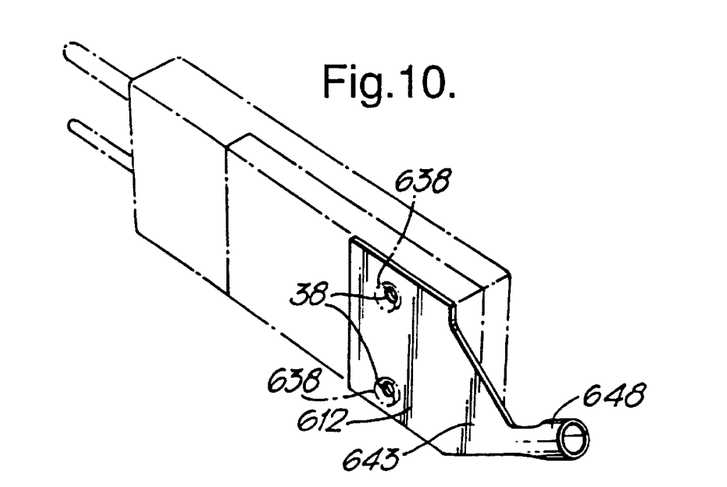
FIG. 10 is a pictorial representation of another embodiment of an electrical device including a ferrite element in accordance with this invention, illustrating the signal inhibiting element mounted in an external retro-fit configuration on an existing device that did not incorporate a ferrite element in its original construction.

FIG. 10 illustrates an alternate form of construction for the connector device of FIGS. 8 and 9, in which an externally mounted element 648 is supported by a bracket 643 that is separately attached to the exterior of the connector housing 612. The means of attachment may be known separable mounting means such as, for example, a pair of screws 638, that are threadedly engaged to threaded bores 38 first describe herein with reference to FIG. 1. In this regard, it should be noted that a bracket 643 with an element 648 may by mounted, if desired, to the connector housing illustrated in FIG. 1, using the same fastening screws 35 (as shown in FIG. 1) to both secure the bracket to the housing and to secure together the separable housing parts 14 and 16.

Figure 11:
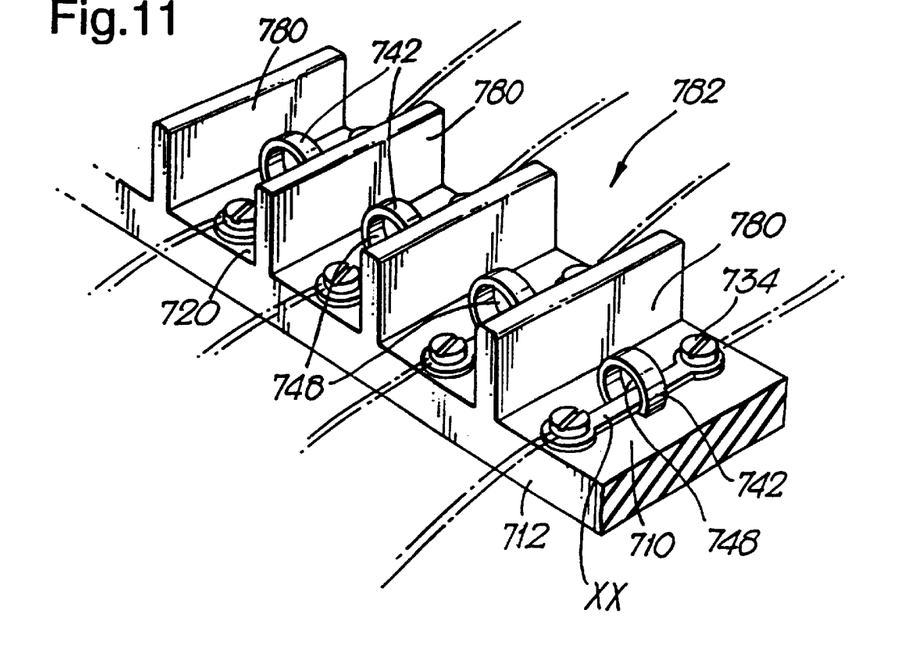
FIG. 11 is a pictorial representation of a device including a ferrite element in accordance with this invention, in the form of a terminal strip.
Figure 12:
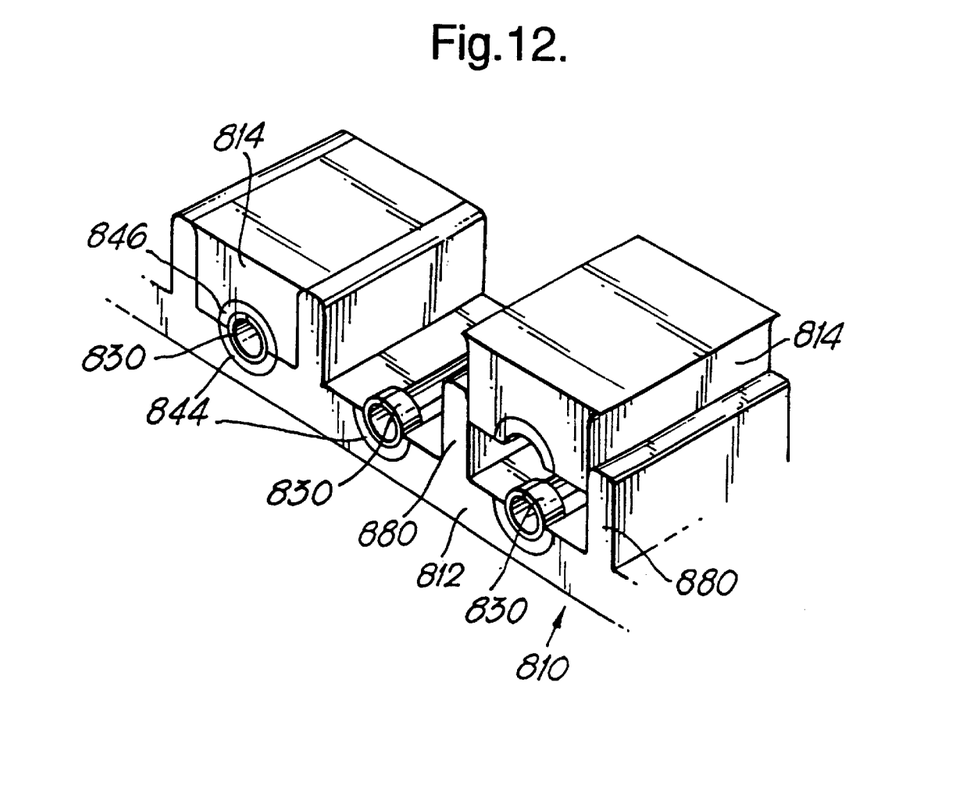
FIG. 12 is a pictorial representation of a different form of the terminal strip connector shown in FIG. 11.

FIGS. 11 and 12 illustrate embodiments in accordance with this invention in the form commonly identified in the electrical connector industry as terminal strips. The terminal strip connector 710 of FIG. 11 comprises a housing 712 of insulating material having a plurality of parallel spaced-apart barrier walls 780 extending from a contact supporting surface 720 one side of the strip, in each space 782 between adjacent barrier walls 780, a metallic contact XX of generally known design and function is mounted on or in surface 720, in whole or in part. Each such contact XX may have for example, a screw terminal 734 threadedly engaged to the conductive material of the contact for separately securing an external conductor, such as a wire lead, electrically and mechanically to the strip; when a separate wire lead is connected to the screw terminals at each end of a contact strip XX, a continuous electrical path is established from one external conductor to the other through the contact strip XX and extending outwardly and away from the terminal strip in two directions. It will be understood, of course, that electricity will be assumed to flow, according to convention, primarily in one direction through the path thus established. In accordance with this invention, in each space 782, an element 742 having a central conductor passage 748 is mounted to the body 712 of terminal strip connector 710, so that the corresponding contact strip XX extends through the conductor passage 748 with the screw terminal portions 734 at opposite ends of the contact XX being positioned on axially opposite sides of the ferrite element 742. In this manner it will be understood readily by those having skill in this art, that the continuous electrical path extending though the contact element XX will also extend through a ferrite element 742, thus providing an improved terminal connector strip in which each connected wire lead will benefit from the antenna-effect suppression of the core without requiring any additional structure or additional serially connected wire leads.

FIG. 12 illustrates a modified form of a terminal strip connector device 810, in which the housing member 812 further includes a separable cover portion 814 that is configured to be separably retained between pairs of adjacent, spaced-apart barrier walls 880 in any convenient manner, such as interference fit or inter-engaging projections and retention shoulders (not shown) of well-known design. A ferrite element divided into two parts 844 and 846 is positioned with part of the element in the housing body 812 and the other part in the cover member 814, such that when the cover is engaged to the housing, the element parts 844, 846 will come together in alignment to form a complete element surrounding a corresponding contact element 830. This configuration may be particularly advantageous when it is necessary desirable to provide enlarged (in diameter or in length or both) elements to surround paths that may be especially susceptible to stray electromagnetic signals of an undesired nature.

Figure 13:
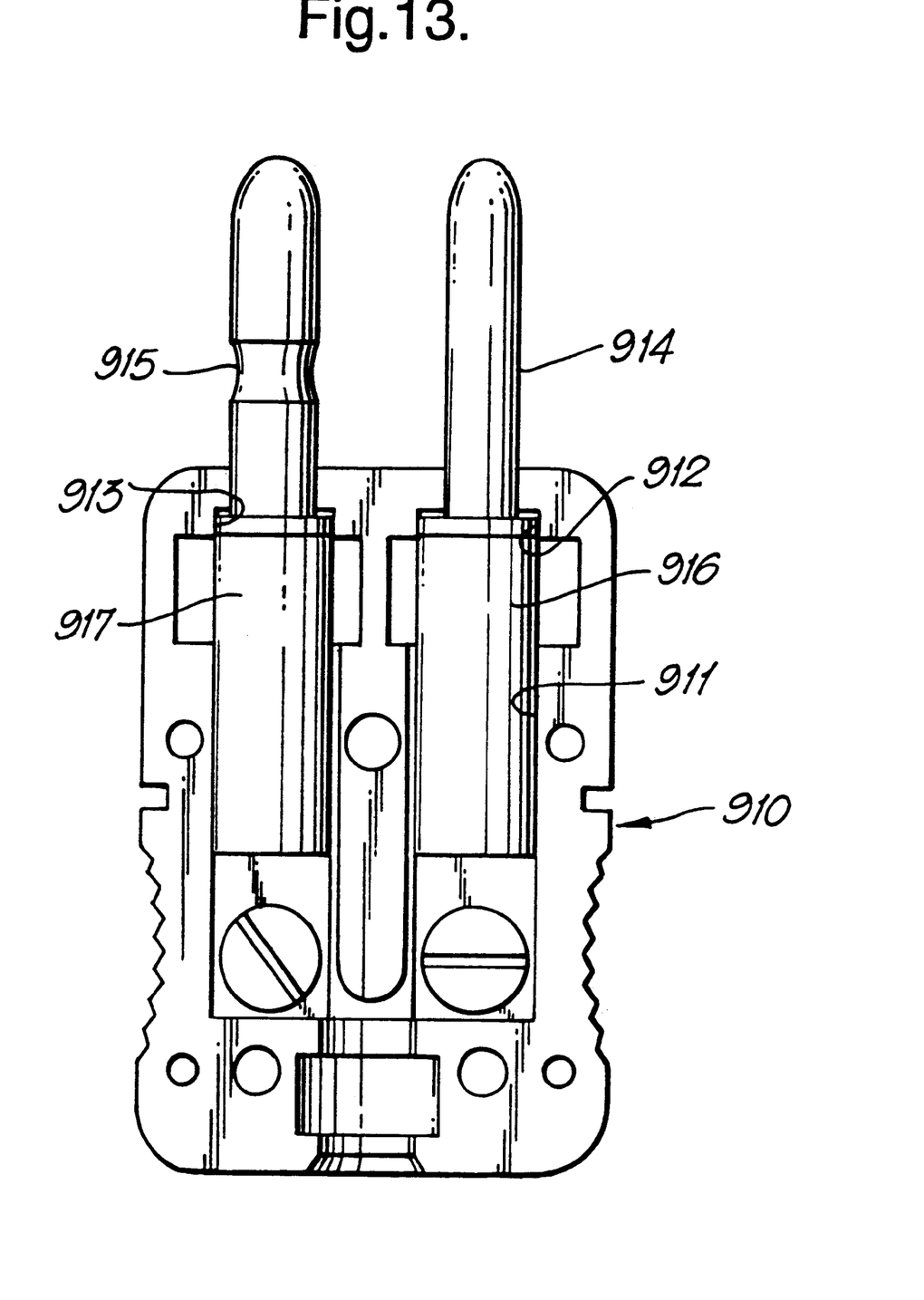
FIG. 13 shows a male plug with split ferrite sleeves on each pin.

In FIG. 13 the half casing 910 is recessed as at 911, 912 and 913 to receive and locate male pins 914 and 915, each of which has an intermediate portion along its length made of reduced diameter so as to receive and locate a respective ferrite sleeve 916, 917 which is split longitudinally.

Figure 14:
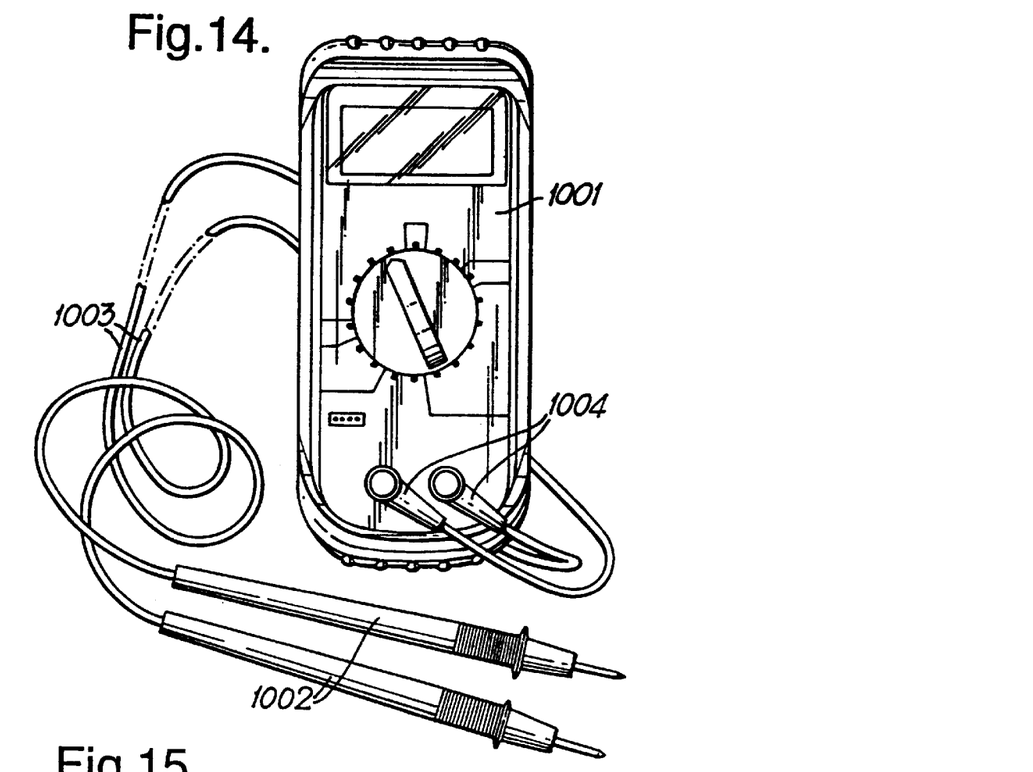
FIG. 14 is an elevation of a representative test meter having a pair of leads in each of which there is an antenna-effect inhibiting means incorporated at the juncture of the lead with the meter.

Referring to FIG. 14 there is shown a representative test meter 1001 having associated with it two test probes 1002 connected by respectivle leads 1003 to fixed or removable connectors 1004. Antenna-effect inhibiting collars or sleeves, for example as described above with reference to any of the preceding figures, are enclosed within the probes and/or the connectors, and encircle the conductors therein.

Figure 15:
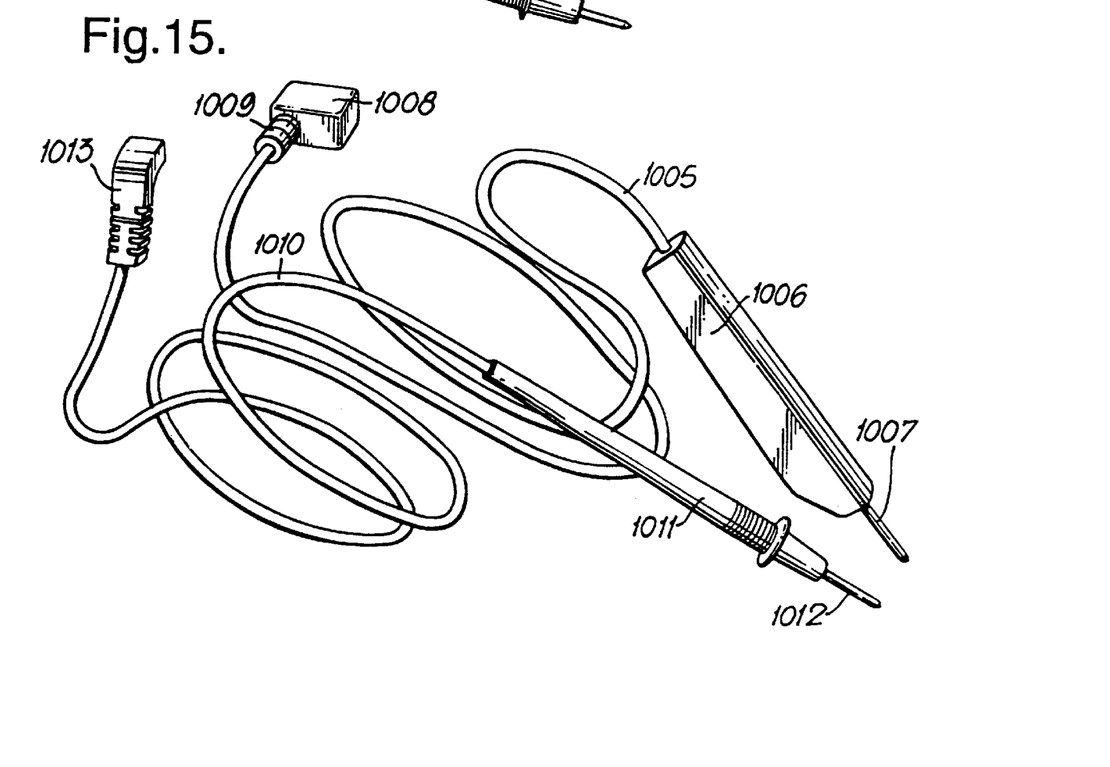
FIG. 15 is an elevation of two leads, for use with a test meter, each having a different form of connector to engage with terminals of a meter (not shown).

Referring to FIG. 15 there are shown two conductor leads 1005 and 1010. Lead 1005 has at one end a handle 1006 with probe 1007, and at the other end a first kind of plug or socket connector 1008 on which is included an antenna-effect inhibiting collar 1009. Lead 1010 has at one end a handle 1011 with probe 1012, and at the other end a different form of plug or socket connector 1013 in which there is an antenna-effect inhibiting collar or sleeve (not shown), as described above with reference to any of the preceding figures.

Figure 16:
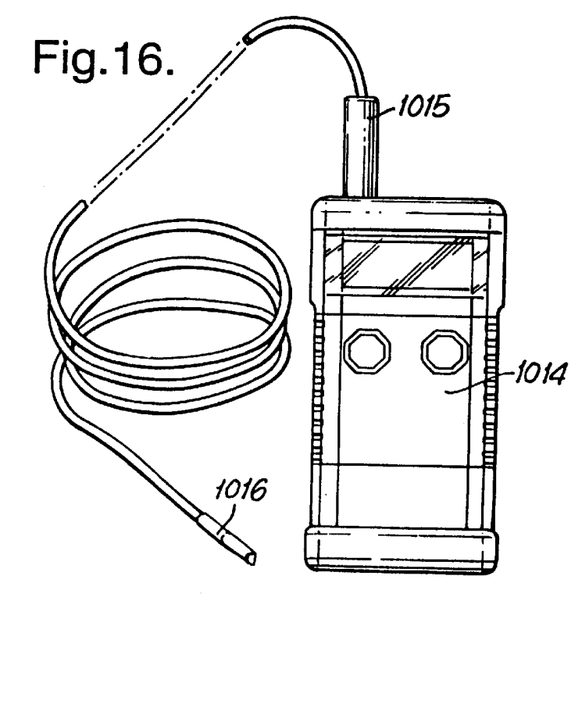
FIG. 16 is an elevation of a test meter having, for example, a thermocouple probe connected to it by a twin-core lead which is enclosed, at its point of entry to the meter, by an antenna-effect inhibiting sleeve.

In FIG. 16 a meter 1014 receives a connector 1015, for a thermocouple 1016, which includes an antenna-effect inhibiting member (not shown) which is of the kind referred to in the preceding figures, see especially items 916, 917 of FIG. 13, arranged about both wires.

Figure 17:
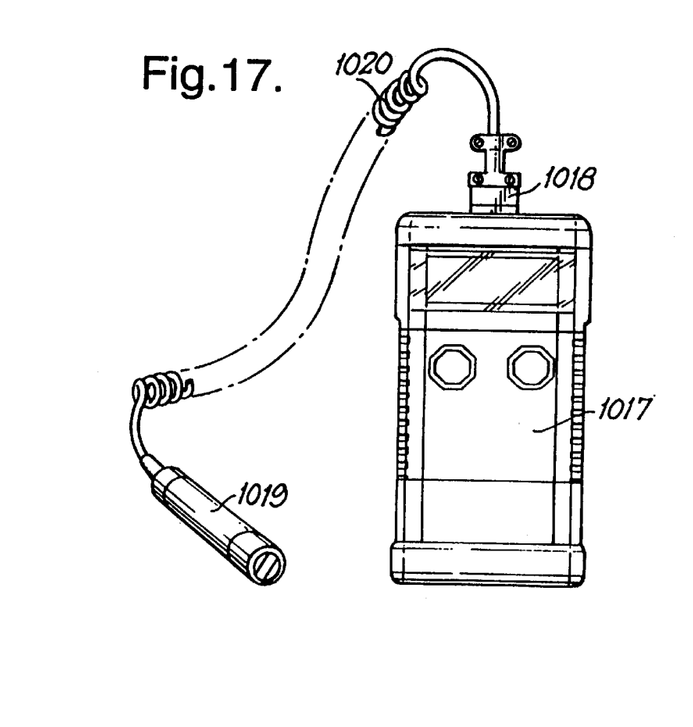
FIG. 17 is an elevation of a test meter in which the twin-core lead is connected by a two-pin plug incorporating an antenna-effect inhibiting sleeve.

In FIG. 17 a meter 1017 receives a removable connector 1018 for a probe 1019 with lead 1020. A collar or sleeve, of antenna-effect inhibiting means, as described precedingly, is disposed with the connector 1018 about each of the conductors therein.

Figure 18:
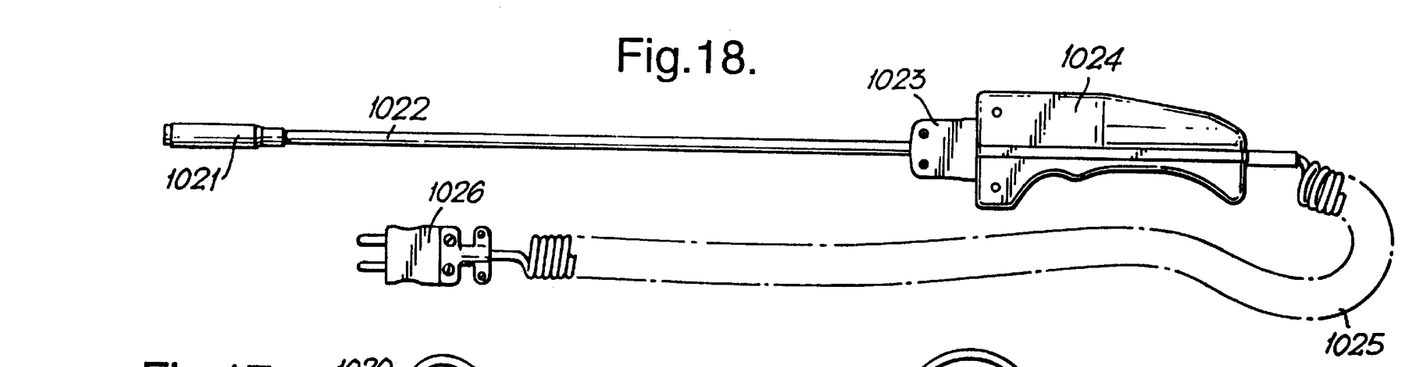
FIG. 18 is an elevation of a test probe, with twin core lead, wherein an antenna-effect inhibiting member, such as a sleeve or a collar, is provided both where an elongated probe joins a handle, and where a two-core lead joins a two pin plug.

In FIG. 18. a thermocouple device includes a probe 1021 having two conductors (not shown) which pass through a stem 1022 to a connector plug 1023 removably connected to a handle 1024 at the end of a twin lead 1025 terminating in a two pin plug connector 1026. An antenna-effect inhibiting collar or sleeve, as described precedingly herein, is disposed within the connector plug 1023 and about the conductors therein. Alternatively, or in addition, an antenna-effect inhibiting collar or sleeve, as described precedingly herein, is disposed within the two pin plug connector 1026.

Figure 19:
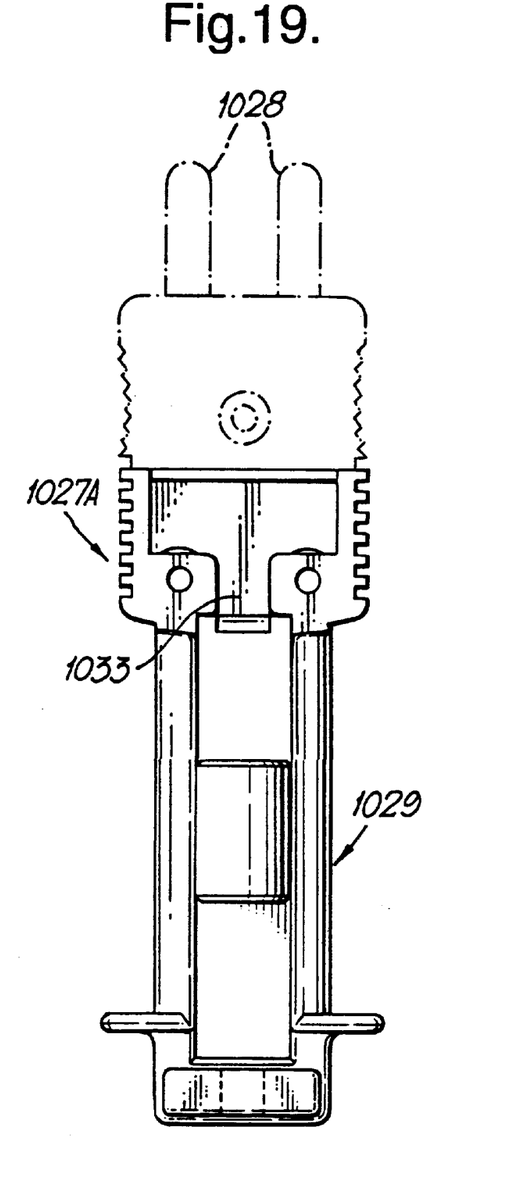
FIG. 19 is a partial elevation if a two-pin plug having incorporated therein a so called wire caddie which includes a sleeve of antenna-effect inhibiting material.
Figure 20:
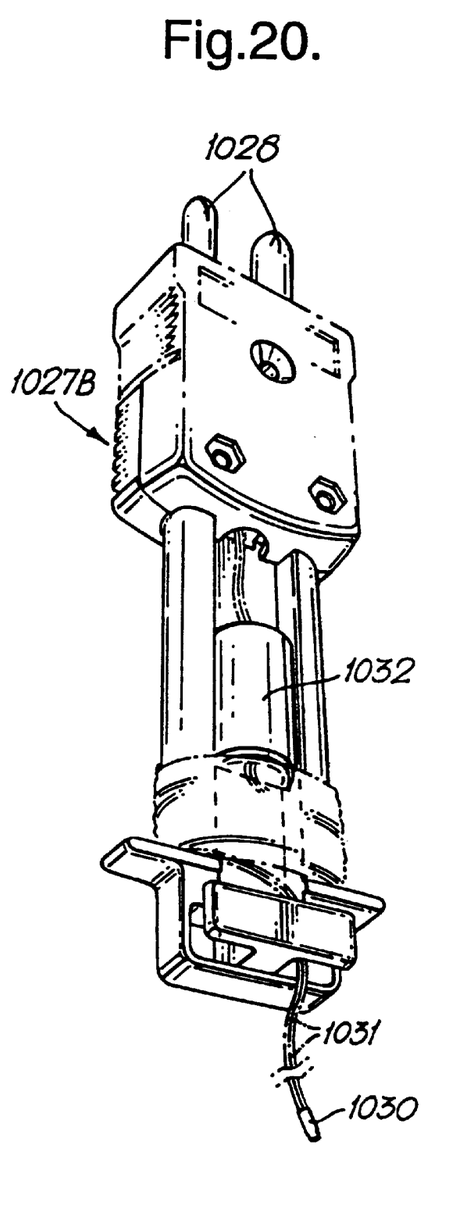
FIG. 20 is a perspective view of a completely assembled plug, of the kind shown in FIG. 19, showing how the twin lead to the plug passes from the plug through the sleeve and is then stored temporarily by wrapping about the wire caddy.

FIGS. 19 and 20 are views of two embodiments of two pin connector 1027A and 1027B having at one end two pins 1028, and at the other end a wire caddy 1029. FIG. 20 shows a thermocouple 1030 having twin leads 1031 which are connected internally of the connector to respective pins 1028, and emerge from the connector 1027 to pass through a sleeve 1032 of antenna-effect inhibiting material. FIG. 19 is partially sectioned to show an internal double-radiussed collar or sleeve 1033 through which the leads (not shown) would pass.

Figure 21:
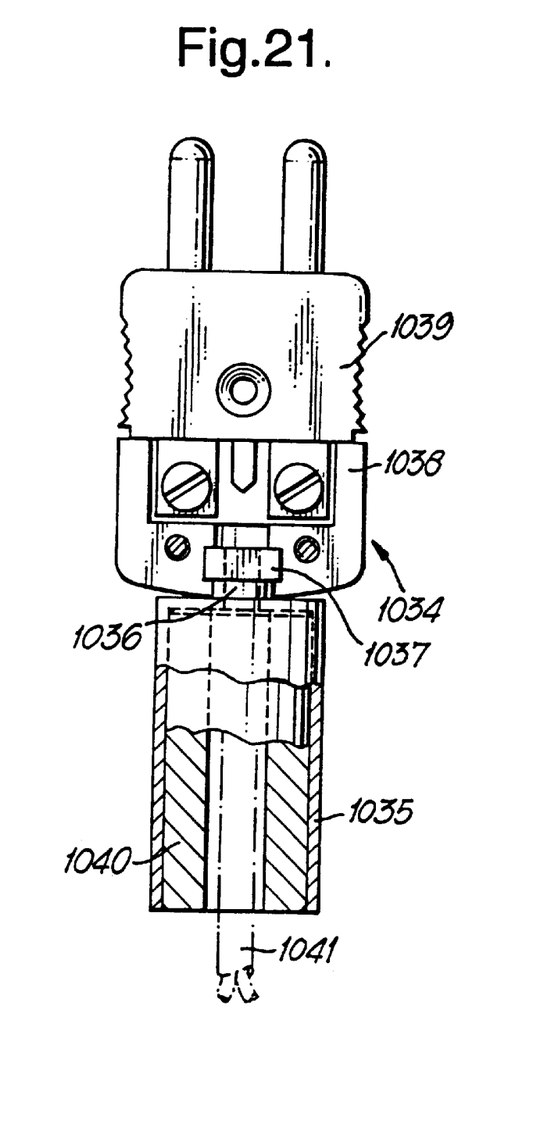
FIG. 21 is a partially sectioned view of a two-pin plug to show both an internal collar, and an external sleeve, adapted to surround the wire leads to its terminal pins.

FIG. 21 shows a two pin connector 1034 which receives a casing 1035 formed with a neck 1036 carrying a head 1037 by which the casing 1035 becomes locked to the connector body 1038 when a cover portion 1039 (shown partially cut away) is bolted in position. Within the casing 1035 there is positioned a sleeve 1040 of antenna-effect inhibiting material, through which passes a twin conductor 1041.

Figures 22, 23, 24:
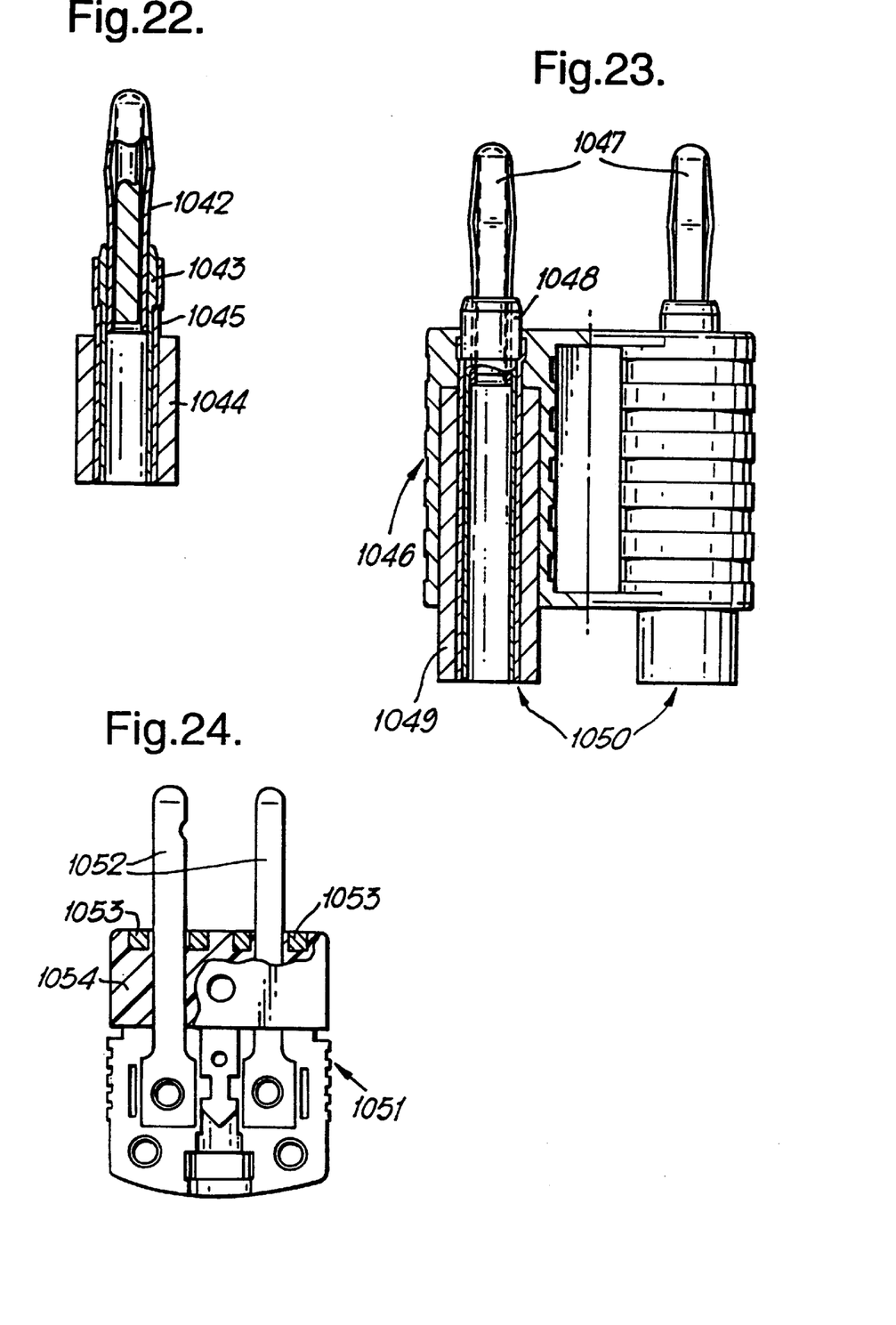
FIG. 22 is an axial section of a banana plug adaptor including a sleeve of antenna-effect inhibiting means.
FIG. 23 is a partially sectioned view of a two-pin adaptor wherein each pin-and-socket assembly has a collar of antenna-effect inhibiting material about the pin portion of the assembly.
FIG. 24 is a partially-sectioned view of a two-pin plug assembly having a collar of antenna-effect inhibiting material about the entry for the leads, and also a further such collar about each pin.

Referring to FIG. 22 there is shown a "banana" plug having a metal pin position 1042 about which is portioned a collar 1043 of antenna-effect inhibiting material secured on the body 1044 by a sleeve 1045.

Referring to FIG. 23 there is shown a banana jack adapter 1046 having two metal pins 1047 each of which is encircled by a collar 1048 and by a sleeve 1049, both of antenna-effect inhibiting material, to inhibit such effect respectively where the pins 1047 coact with a socket (not shown and where the sockets 1050 respectively coact with pins (not shown) of another component.

Referring to FIG. 24 there is shown, with part broken away, a two pin connector 1051 having two pins 1052 each of which is encircled by a respective collar 1053 of antenna-effect inhibiting material housed within the general body 1054 of the connector.

In another useful arrangement a "multi-plug adaptor" comprises a conveniently shaped body, e.g. a cube, having at a plurality of its faces respective sets, e.g pairs of pins or sockets of various shapes and dimensions to enable the adaptor to engage with plug pins, or sockets, of leads or other adaptors or devices or components, to enable connection of otherwise non-matching items, some or all of the pins and/or sockets of the adaptor having associated antenna-effect inhibiting means such as collars, sleeves or other enclosing or mounting bodies.

Figure 25:
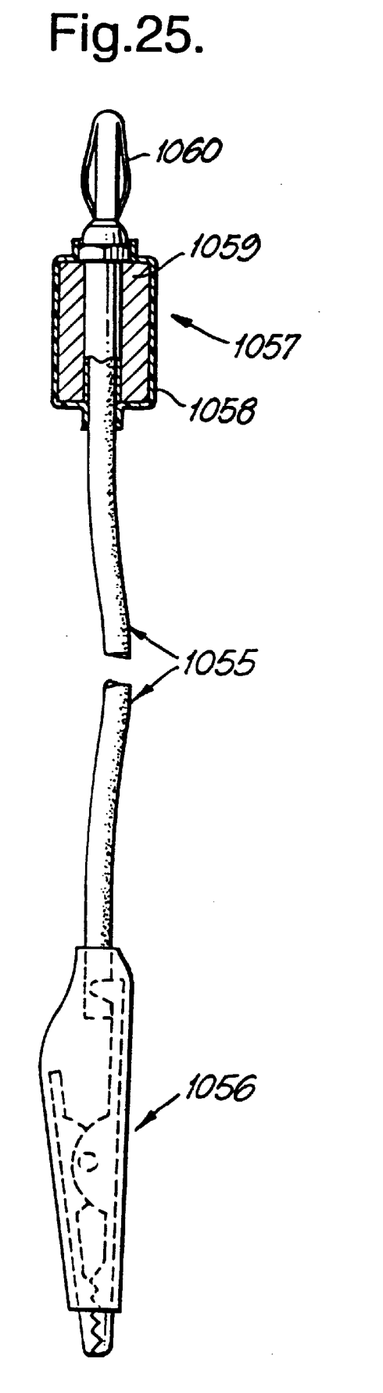
FIG. 25 is a lead having at one end a crocodile clip and at the other end a banana plug protected by ferrite.

In FIG. 25 there is shown a single-conductor lead 1055 having at one end a known crocodile clip 1056. At the other end there is a banana plug 1057 wherein a casing 1058 houses a sleeve 1059, of an antenna-effect inhibiting material, which surrounds the conector (not shown) which is attached to the plug terminal 1060. Antenna-effect inhibiting material, e.g "ferrite" may be present in the banana plug and in the socket in which it is received.

The antenna-effect inhibiting means may be fitted to or applied on the or each contact member by methods including for example pre-forming said means and there after fitting it, e.g. by snap-fit, use of fastenings, or securing of portions of a whole about the contact member, or in another manner application of the inhibiting material by shrinking in position, or spraying it on, or by dipping the contact member in the inhibiting material or by enrobing, coating, lacquering or spraying.

The quantity, dimensions, shaping and other physical features of the inhibiting means may be selected before application, or modified after application, for enhancement of its effect, e.g. by tuning to a capacity and/or wavelength of operation suited to the kind of antenna-effect interference to be expected.

Although various specific embodiments of this invention have been described and illustrated herein, it will be obvious to those having skill in this art that various other fully equivalent embodiments consistent with the invention are possible and evident within the scope of this disclosure.

We claim:

1. In an electrical thermocouple device which includes two contact members each of dissimilar metal, each member having an outer connection surface for electrically connecting to a mating connector, the improvement comprising a ferrite element disposed within a common housing integral with the outer connection surface of at least one of said contact members and having a single central axial passage therethrough.

2. In an electrical device, as claimed in claim 1, said ferrite element being incorporated with said device.

3. In an electrical device, as claimed in claim 1, said ferrite element being a module separably incorporated with said device.

4. In an electrical device, as claimed in claim 1, said ferrite element means being incorporated in said one contact member.

5. In an electrical device, as claimed in claim 1, said ferrite element means forming a housing for said at least one contact member.

6. An electrical device in accordance with claim 1 wherein said housing is formed of a first separable housing portion and a second separable housing portion, said housing portions being separable about a common separation plane and said ferrite element is formed of a first separable element portion and a second separable element portion, said separable portions being separable about a plane extending through said conductor opening, said first separable portion being mounted to said first separable housing portion and said second separable portion being mounted to said second separable housing portion, such that upon separation of said first and second separable housing portions said first and second separable element portions will separate also so that a conductor may be moved laterally into and out of said conductor passage in said ferrite element, and upon engagement of said first separable housing portion with said second separable housing portion said first and second separable element portions are engaged in a mating relationship.

7. An electrical device in accordance with claim 1 wherein said housing member is configured for mounting said connector to a panel.

8. In an electrical device, as claimed on claim 1, said ferrite element being an electromagnetic suppressor.

9. In an electrical device, as claimed in claim 8, said at least one contact member being one part of a multi-part plug and socket connector.

10. In an electrical device, as claimed in claim 1, said ferrite element means surrounding said connection surface.

11. In an electrical device, as claimed in claim 10, said ferrite element being a multi-part element assemblable about said connection surface.

12. In an electrical connector device attached remotely to a thermocouple by dissimilar metal wire leads, comprising a housing having male contact portions extending from said housing and coupled within said housing to said wire leads, the improvement in which at least one of said leads passes along a ferrite element, said ferrite element disposed integrally with an outer surface of the male contact portions and internally positioned within said housing.

13. The improvement of claim 12 in which the ferrite element is a toroid and includes a single central opening through which said at least one wire lead passes axially.

\* \* \* \* \*